(12) United States Patent
Johnson et al.

(10) Patent No.: US 12,093,669 B1
(45) Date of Patent: Sep. 17, 2024

(54) MASSIVELY PARALLEL COMPILATION OF APPLICATION CODE

(71) Applicant: Amazon Technologies, Inc., Seattle, WA (US)

(72) Inventors: Troy Aaron Johnson, Eagan, MN (US); Stephen Markus Sachs, Berlin (DE); Pate Motter, Seattle, WA (US); Luiz Antonio DeRose, Rosemount, MN (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 193 days.

(21) Appl. No.: 17/196,127

(22) Filed: Mar. 9, 2021

(51) Int. Cl.
*G06F 8/41* (2018.01)

(52) U.S. Cl.
CPC ............... *G06F 8/443* (2013.01); *G06F 8/45* (2013.01)

(58) Field of Classification Search
CPC .................................. G06F 8/443; G06F 8/45
USPC ........................................................ 717/151
See application file for complete search history.

(56) References Cited

U.S. PATENT DOCUMENTS

| | | | | |
|---|---|---|---|---|
| 5,774,728 A | * | 6/1998 | Breslau et al. ........... | G06F 8/47 717/141 |
| 2010/0037035 A1 | * | 2/2010 | Archer et al. .......... | G06F 8/443 717/28 |
| 2013/0227544 A1 | * | 8/2013 | Ben-Itzhak et al. .. | G06F 8/0643 717/174 |
| 2022/0058006 A1 | * | 2/2022 | Wu et al. ................ | G06F 8/443 |

OTHER PUBLICATIONS

Serverless Computing—AWS Lambda—Amazon Web Services. Retrieved on Jul. 6, 2023. https://aws.amazon.com/lambda/.
Function as a service—Wikipedia. Retrieved on Jul. 6, 2023. https://en.wikipedia.org/wiki/Function_as_a_service.
Serverless computing—Wikipedia. Retrieved on Jul. 6, 2023. https://en.wikipedia.org/wiki/Serverless_computing.
AWS Lambda—Wikipedia. Retrieved Jul. 6, 2023. https://en.wikipedia.org/wiki/AWS_Lambda.
Distcc: a fast, free distributed C/C++ compiler. Retrieved Jun. 9, 2023. https://www.distcc.org.
Distcc, a fast free distributed compiler. Retrieved Jun. 9, 2023. https://www.distcc.org/distcc-lca-2004.html.

* cited by examiner

*Primary Examiner* — Qing Chen
*Assistant Examiner* — Mohammed N Huda
(74) *Attorney, Agent, or Firm* — Thomas Horstemeyer, LLP (57) ABSTRACT

Disclosed are various embodiments for massively parallel compilation of application code. A compiler application is executed in a compute instance of an elastic computing device. When an instruction to compile source code of an application is received, the compiler application generates virtual processes to compile a portion of the source code of the application separate from the compute instance having the compiler installation executing thereon. When the virtual processes complete the compilation of the source code, build artifacts are linked to generate an executable computing application.

20 Claims, 7 Drawing Sheets

Software Development Application 206

```
DotnetStack.cs
Main.cs    DotnetStack.cs
src > TalkDotnet > TalkDotnet.cs > ...
 1  using AlphaCo.CDK;
 2  using AlphaCo.CDK.AWS.IAM;
 3  using AlphaCo.CDK.AWS.SNS;
 4  using AlphaCo.CDK.AWS.SNS.Subscription;
 5  using AlphaCo.CDK.AWS.SQS;
 6
 7  Namespace TalkDotnet
 8  {
 9      1 reference
10      public class TalkDotnetStack : Stack
11      {
12          1 reference
13          public TalkDotnetStack(Construct parent, string id, IStackProps props)
14          {
15              var queue = new Queue(this, "MyFirstQueue", new QueueProps
16              {
17                  visibilityTimeout = Duration.Seconds(300)
18              });
19              var topic = new Topic(this, "TestTopic", new TopicProps
20              {
21                  DisplayName="TestTopic"
22              });
23              topic.AddSubscription(new SqsSubscription(queue, null));
24              }
25          )
26      }
27  }
28
```

FILE EXPLORER
  Open Editors
    TalkDotnet
  TalkNet Files
    src
      TalkDotnet
        TalkDotnet.csproj
        TalkDotnetConstruct.cs
        TalkDotnetStack.cs
      Main.cs
      TalkDotnet.sln
    .gitignore
    kak.json
    README.md master ⊘0 ⓘ0

MASSIVELY PARALLEL COMPILATION OF APPLICATION CODE

BACKGROUND

Compilers include computing applications that translate programming code written in a human-readable programming language into a machine-readable code that is executable by a processor. For instance, a compiler may convert application code written in the "C" programming language to assembly, machine, or binary code executable by a hardware processor. Today, computing applications tend to be rather large, having thousands of source code files with hundreds of thousands of lines of code. Compilers are generally executed locally on a device of a developer, but have also migrated to server-based compilation. Compiling large applications on a server or a client device into an executable program can take hours to days.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to the massively parallel compilation of application code, for instance, to speed up compilation times and improve computational efficiency of various computing devices. As noted above, compiling large applications into an executable program on a desktop computing device can take hours to days. To speed up compilation of a computing application, parallel compilation of source code files into machine code or other desired format is attempted. However, parallel compilation of a computing application is generally limited to a number of processor cores of a computing device handling the compilation.

For instance, some developers use provider network services to compile applications remotely as provider network services are able to provide significant improvements in memory, central processing unit (CPU) capabilities, and other computing resources which, in turn, reduces compile times. However, many provider network services suffer a performance penalty when compiling computing applications in a compute instance.

Developers may attempt to further reduce compiling time by compiling more files in parallel or, at the same time, to reduce an overall build time. However, this parallelism is limited by the number of cores available in the compute instance.

Accordingly, various embodiments are described herein for improving compilation performance, refining price-to-performance ratios, and making various provider network services more attractive to developers. Launching compilations in various types of provider network services, such as an on-demand code execution service, allows parallel compilation to exceed a number of cores and build all files in a computing application at the same time. Data aggregated during compilation may be used to help inform developers about useful option combinations, which allows those combinations to be used more thoroughly. Accordingly, various embodiments are described for achieving a speed-up in compilation time by compiling a computing application in parallel without being limited by a number of processing cores or other hardware constraints.

In various embodiments, a compiler application allows developers and other users to build high-performance applications for cloud compute instances that use processors and other hardware through a provider network service. For instance, a provider network service may make available processors having 64-bit Arm Neoverse cores or other desirable hardware. The compiler application may build applications written in C++, C, Fortran, or other suitable programming languages. The compiler application may be tuned for high-performance computing (HPC) applications, such as weather prediction and computational fluid dynamics and, thus, offers greater performance than general-purpose compilers which tune for a broader space of applications.

According to various embodiments, a networked environment is described having a first computing environment with an on-demand code execution service executing thereon and a second computing environment with an elastic computing service executing thereon. The first computing environment may receive an instruction from the second computing environment to compile source code into an executable computing application. To do so, the first computing environment may create virtual processes. The virtual processes may execute in parallel in the first computing environment to compile the pre-processed source code files into build artifacts, such as object files. The first computing environment may then send the build artifacts to the second computing environment to link the build artifacts and ultimately generate an executable computing application.

In some embodiments, the first computing environment includes a first set of one or more computing devices having the on-demand code execution service executing thereon. As such, the processes may include serverless functions executable by the on-demand code execution service. Further, in some embodiments, the second computing environment includes a second set of one or more computing devices having the elastic computing service executing thereon. A container instance of the elastic computing service may have a compiler application installed therein. Accordingly, the instruction received from the second computing environment may include an instruction sent by the compiler application in some embodiments.

The embodiments described herein provide various benefits over the existing state of the art. For instance, parallel compilations of computing applications are not limited by a number of cores assigned to a compute instance. Instead, the compilation of each source file executes as a separate code function such that developers experience massive build parallelism initiated from a lightweight instance. Further, the compiler application may collect usage data anonymously for developers that opt-in thorough submitted source code and command-line options, which is aggregated from different customers that build the same application. Developers may use a special compiler option to query the most frequently used compiler options for a given source file, which may reveal previously unknown optimizations.

Additionally, various embodiments described herein permit a less capable computing device, on which parallel compilation normally would be limited by its number of processing elements and memory capacity, to distribute a bulk of the compilation workload to another system. As such, the workload on a computing environment is reduced to pre-processing the source files, a relatively fast procedure, sending the pre-processed files and user-specified compiler options, waiting for the compilation to finish on another system, receiving the build artifacts, and linking together the build artifacts to create an executable computing application. As the computing environment spends most of its time performing input-output (I/O) operations and waiting for results, the computing environment retains ample compute and memory resources to handle preprocessing and linking.

In the following discussion, a general description of the system and its components is provided, followed by a discussion of the operation of the same.

Figure 1:
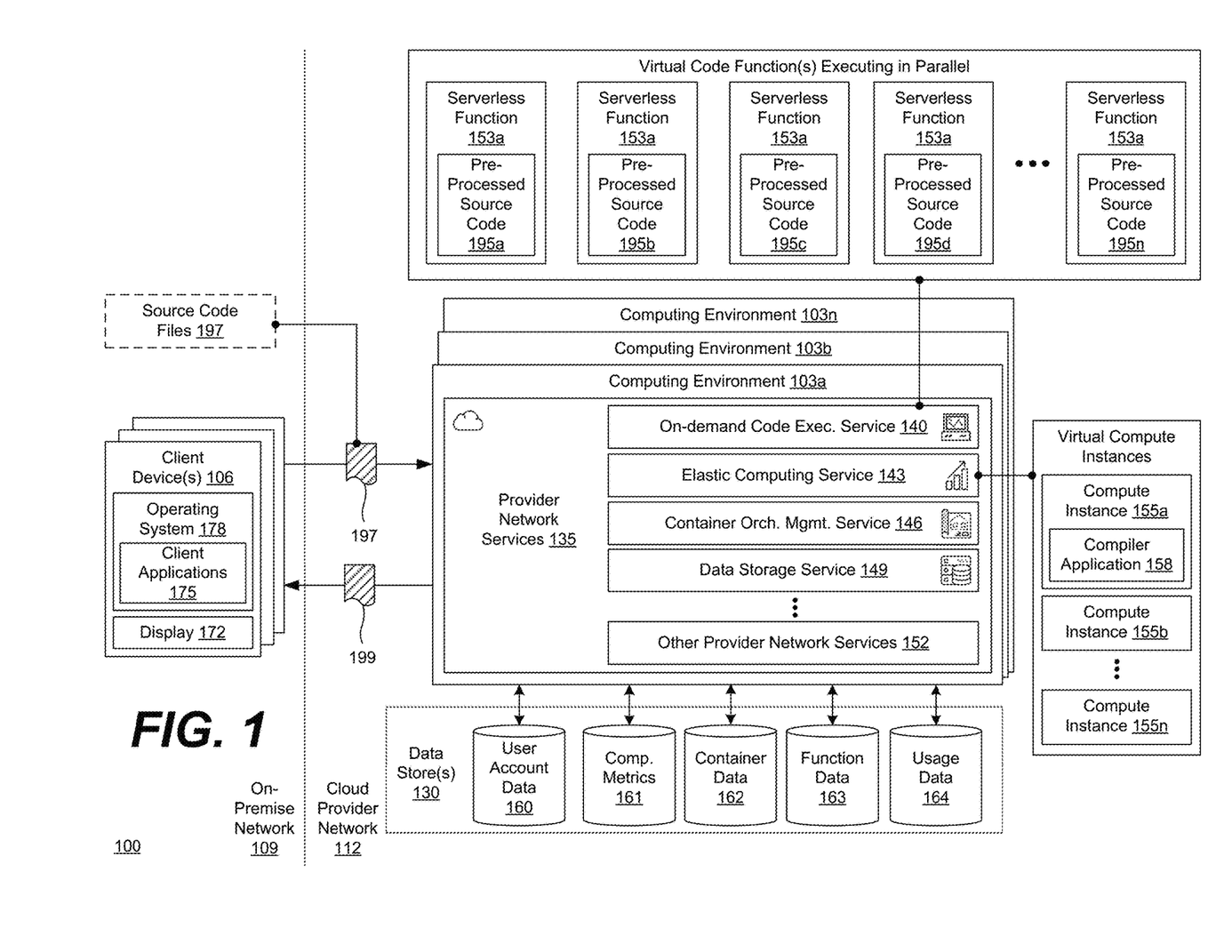
FIG. 1 is a drawing of a networked environment according to various embodiments of the present disclosure.

With reference to FIG. 1, a networked environment 100 is shown according to various embodiments. The networked environment 100 includes one or more computing environments 103a . . . 103n (collectively computing environments 103) and a client device 106, which are in data communication with each other via a network. The network includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The networked environment 100 may include an on-premise network 109 and a cloud provider network 112 in some embodiments. To this end, the on-premise network 109 may include one or more computing devices, such as the client device 106 and other computing devices, that are deployed behind an enterprise firewall or devices coupled to a particular enterprise network.

On the other hand, the cloud provider network 112 (sometimes referred to simply as a "cloud") may include a pool of network-accessible computing resources, such as compute, storage, and networking resources, applications, and services, which may be virtualized or bare-metal. The cloud provider network 112 may provide convenient, on-demand network access to a shared pool of configurable computing resources that may be programmatically provisioned and released in response to customer commands. These resources may be dynamically provisioned and reconfigured to adjust to variable load. Cloud computing may thus be considered as both the applications delivered as services over a publicly accessible network (e.g., the Internet or a cellular communication network) and the hardware and software in cloud provider data centers that provide those services.

The cloud provider network 112 may be embodied among a number of regions, where a region is a separate geographical area in which the cloud provider clusters data centers. Each region may include two or more availability zones connected to one another via a private high-speed network, such as a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the computing environment 103 and/or the cloud provider network 112. Availability zones within a region may be positioned far enough away from one other that the same natural disaster should not take more than one availability zone offline at the same time.

Customers may connect to availability zones of the cloud provider network 112 via a publicly accessible network (e.g., the Internet or a cellular communication network) by way of a transit center (TC)). TCs may be considered as primary backbone locations linking customers to the cloud provider network, and may be collocated at other network provider facilities (e.g., Internet service providers, telecommunications providers) and securely connected (e.g. via a VPN or direct connection) to the availability zones. Each region may operate two or more TCs for redundancy. Regions are connected to a global network which includes private networking infrastructure (e.g., fiber connections controlled by the cloud provider) connecting each region to at least one other region. The cloud provider network 112 may deliver content from points of presence outside of, but networked with, these regions by way of edge locations and regional edge cache servers. This compartmentalization and geographic distribution of computing hardware enables the cloud provider network 112 to provide low-latency resource access to customers on a global scale with a high degree of fault tolerance and stability.

With cloud computing, instead of buying, owning, and maintaining their own data centers and servers, organizations may acquire technology, such as compute power, storage, databases, and other services, on an as-needed basis. The cloud provider network 112 thus may provide on-demand, scalable computing services, referred to herein as provider network services 135, to users through a network, for example, allowing users to have at their disposal scalable "virtual computing devices" via their use of the compute servers and block store servers. These virtual computing devices have attributes of a personal computing device including hardware (various types of processors, local memory, random access memory (RAM), hard-disk and/or solid state drive (SSD) storage), a choice of operating systems, networking capabilities, and pre-loaded application software.

Each virtual computing device may also virtualize its console input and output (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users may choose to deploy their virtual computing systems to provide network-based services for their own use and/or for use by their customers or clients.

The cloud provider network 112 may implement various computing resources or services, which may include a virtual compute service, data processing service(s) (e.g., map reduce, data flow, and/or other large scale data processing techniques), data storage services (e.g., object storage services, block-based storage services, or data warehouse storage services), and/or any other type of network based services (which may include various other types of storage, processing, analysis, communication, event handling, visualization, and security services not illustrated). The resources required to support the operations of such services (e.g., compute and storage resources) may be provisioned in an account associated with a cloud provider, in contrast to resources requested by users of the cloud provider network 112, which may be provisioned in user accounts.

As such, the networked environment 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc.

The computing environments 103 may include, for example, a server computer or any other system providing computing capability. Alternatively, the computing environment 103 may employ a plurality of computing devices or various sets of computing devices that may be arranged, for example, in one or more server banks or computer banks or other arrangements. Such computing devices may be located in a single installation or may be distributed among many different geographical locations. For example, each of the computing environments 103 may include one or more computing devices that together may comprise a hosted computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environments 103 according to various embodiments. Also, various data is stored in a data store 130 that is accessible to the computing environments 103. The data store 130 may be representative of a plurality of data stores 130 as can be appreciated. The data stored in the data store 130, for example, is associated with the operation of the various applications and/or functional entities described below.

The components executed on the computing environments 103 include, for example, provider network services 135a . . . 135n (collectively "provider network services 135"), and other applications, services, processes, systems, engines, or functionality not discussed in detail herein. The provider network services 135 may include web services or cloud provider services that may be invoked using a network service call or an application programming interface (API) call made to a network-based API. An API may refer to an interface and/or communication protocol between the client device 106 and one of the computing environments 103 (e.g., one or more servers), such that if the client device 106 makes a request in a predefined format, the client device 106 would receive a response in a specific format and/or initiate a predefined action. Similarly, an API may refer to an interface and/or communication protocol between different ones of the computing environments 103 (e.g., between different sets of one or more servers), such that if a first computing environment 103a makes a request in a pre-defined format to a second computing environment 103b, the first computing environment 103a would receive a response in a specific format and/or initiate a predefined action.

In a context of a cloud provider network 112, APIs provide a gateway for customers to access cloud or remote computing infrastructure by allowing customers to obtain data from or cause actions within the cloud provider network 112, enabling the development of applications that interact with resources and services hosted in the cloud provider network 112. APIs can also enable different services of the cloud provider network 112 to exchange data with one another. The provider network services 135 may be a portion of one or more of the computing environments 103, and may be maintained and/or operated by a common entity. Alternatively, the provider network services 135 may be independent of the computing environments 103 in some examples and may be operated by a third-party.

In accordance with various embodiments, the provider network services 135 may include one or more of an on-demand code execution service 140 (also referred to as a serverless compute service, function compute service, functions service, cloud d functions service, or functions-as-a-service, in various implementations), an elastic computing service 143 (referred to in various implementations as an elastic compute service, a virtual machines service, a computing cloud service, a compute engine, or a cloud compute service), a container orchestration and management service 146 (referred to in various implementations as a container service, cloud container service, container engine, or container cloud service), a data storage service 149, as well as other provider network services 152. For instance, other provider network services 152 may include a virtualization service, as well as other types of provider network services 135 as can be appreciated.

The on-demand code execution service 140 may offer "on-demand" execution of serverless functions 153a . . . 153n (collectively "code functions") without requiring a customer to provision and maintain a server or computing resources that require 24/7 uptime and a continuous subscription. As such, the on-demand code execution service 140 may also be referred to as a "serverless" compute service, function compute service, functions service, cloud functions service, or functions-as-a-service in various implementations. To this end, a cloud provider may charge a customer for only the computing resources required to execute a serverless function 153, which may include seconds, minutes, or hours of computing time instead of requiring a monthly subscription to provide constant uptime. Each of the serverless functions 153 may include a script, code, or an application that is executed when a network-based API is invoked. In some embodiments, the serverless functions 153 may be executed in parallel to compile source code into build artifacts, as will be described.

To execute a serverless function 153, the on-demand code execution service 140 may spawn a virtual process in a server hosted or maintained by a cloud provider that executes the code and returns a result, such as an output of a function or a build artifact (e.g., compiled code or object code). Metrics associated with the execution of the function are collected, such as CPU usage, processing time, or other metrics, which is then used to charge a customer for the computing resources required to execute the serverless function 153.

The elastic computing service 143 may offer virtual compute instances 155a . . . 155n (collectively "compute instances 155," or referred to as virtual machines or simply "instances") with varying computational and/or memory resources, which are managed by the elastic computing service 143, which may also be referred to in various implementations as a compute virtualization service, a virtual machines service, a computing cloud service, a compute engine, or a cloud compute service. In one embodiment, each of the compute instances 155 may correspond to one of several instance types or families. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics.

Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

It may be appreciated that such compute instances 155 may also be able to run in other environments, for example, on the premises of customers (e.g., in the on-premise network 109), where such on-premise instances may be managed by the cloud provider or a third party. In some scenarios, the compute instances 155 may be lightweight micro-virtual machines (microVMs). The cloud provider network 112 may offer other compute resources in addition to compute instances 155 and microVMs, for example containers (which may run in compute instances 155 or bare metal) and/or bare metal servers that are managed by a portion of a cloud provider service running on an offload card of the bare metal server.

In some embodiments, the execution of compute instances 155 by the elastic computing service 143 is supported by a lightweight virtual machine manager (VMM). The VMMs enable the launch of lightweight microVMs in non-virtualized environments in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example, by being run as isolated processes by the VMM. A microVM, as used herein, refers to a VM initialized with a limited device model and/or with a minimal OS kernel that is supported by the lightweight VMM, and which can have a low memory overhead of less than 5 MiB per microVM, for example, such that thousands of microVMs can be packed onto a single host.

For example, a microVM can have a stripped-down version of an operating system (OS) kernel (e.g., having only the required OS components and their dependencies) to minimize boot time and memory footprint. In some implementations, each process of the lightweight VMM encapsulates one and only one microVM. The process can run at least one of the following threads: API, VMM, and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core). A microVM can be used in some implementations to run a containerized workload.

The compute instances 155 permit installation and execution of various computing applications, such as a compiler application 158. The compiler application 158 may include a computing application executed remotely from the client device 106 that translates source code from a first code format to a second code format. As such, in some scenarios, the compiler application 158 translates first, higher-level code into a second, lower-level code. For example, the compiler application 158 may convert C or C++ into assembly or machine code, and so forth. Further, the compute instances 155 may permit installation and execution of a compiled computing application, which may include an executable computing application generated by the compiler application 158 in some embodiments.

The container orchestration and management service 146 may enable customers to run containerized workloads, for example, on their own instances or on managed instances through a serverless container service. A container represents a logical packaging of a software application that abstracts the application from the computing environment 103 in which the application is executed. For example, a containerized version of a software application includes the software code and any dependencies used by the code such that the application can be executed consistently on any infrastructure hosting a suitable container engine (e.g., the Docker® or Kubernetes® container engine).

A container image may be a standalone, executable package of software that includes everything needed to run an application process, such as code, runtime, system tools, system libraries, and settings. Container images become containers at runtime. Containers are thus an abstraction of the application layer (meaning that each container simulates a different software application process). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, other configurations) used to enable the application to run in a container engine.

The data storage service 149, for example, may be an elastic block store service (also referred to as a network-based data storage service, a cloud disks service, managed disk service, storage area network service, persistent disk service, or block volumes, in various implementations) that supports customer volumes. In general, a volume can correspond to a logical collection of data, such as a set of data maintained on behalf of a user. The data of the volume may be erasure coded and/or replicated between multiple devices within a distributed computing system in order to provide multiple replicas of the volume (where such replicas may collectively represent the volume on the computing system).

Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Data may be accessed from the data storage service 149 using on or more API calls, and typically can be used to transfer data having large file sizes.

The data stored in the data store 130 includes, for example, user account data 160, compiler metrics 161, container data 162, function data 163, compiler usage data 164, and potentially other data. The user account data 160 may include information associated with a developer of a user of a compiler application 158, such as login, password, biometric information, or other data that may be used to authenticate a developer or other user of the compiler application 158 or provider network service 135.

The compiler metrics 161 may include compile times, resources used, as well as other metrics that may be collected during or after a computing application is compiled. For instance, compiler metrics 161 may specify how long a computing application took to be compiled, the CPU, memory, and other computational resources utilized to compile, as well as other metrics. The container data 162 may include information for instantiating or maintaining compute instances 155 in the elastic computing service 143. Similarly, the function data 163 may include information for instantiating or maintaining serverless functions 153 in the on-demand code execution service 140. Compiler usage data 164 may include data reflecting commonly used compiler flags, settings, and other data. The compiler usage data 164 may be aggregated from opting-in developers to suggest most-commonly used compiler options or other optimizations for compiling a computing application.

The client device 106 is representative of a plurality of client devices 106 that may be coupled to the network. The client device 106 may include, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 may include a display 172. The display 172 may comprise, for example, one or more devices such as liquid crystal display (LCD) displays, gas plasma-based flat panel displays, organic light emitting diode (OLED) displays, electrophoretic ink (E-ink) displays, LCD projectors, or other types of display devices, etc.

The client device 106 may be configured to execute various applications, referred to as client applications 175, as well as an operating system 178. The client applications 175 may be executed in a client device 106, for example, to access network content served up by the computing environments 103 and/or other servers, thereby rendering a user interface on the display 172. To this end, the client applications 175 may include, for example, a browser, a dedicated application, etc., and the user interface may include a network page, an application screen, etc. In some embodiments, the client applications 175 may include a software development application where a developer may create source code files and input source code that is transmitted to the computing environment 103. The client device 106 may be configured to execute applications beyond the client applications 175 such as, for example, email applications, social networking applications, word processors, spreadsheets, and/or other applications.

Next, a general description of the operation of the various components of the networked environment 100 is provided. To begin, a developer may interact with a client device 106 to provide, write, or modify source code files 197 to generate an executable computing application. In some embodiments, the computing application to be compiled may include a client application 175 for execution on a client device 106. In alternative embodiments, the computing application to be compiled may include a web, network, or server application that executes remotely from the client device 106, for instance, in one or more of the computing environments 103. It is understood that the developer interacts with a software development application on the client device 106 to build or modify the computing application through writing and refinement of the source code files 197, which may include source code in C, C++, Fortran, Python, or other programming language.

To compile source code written by the developer into an executable computing application 199, in some embodiments, a customer may install a compiler application 158 in a first compute instance 155*a*. The compiler application 158 may create or utilize additional compute instances 155 to perform compilation of source code into a build artifact. For example, assume that the compiler application 158 is compiling an application having one hundred source code files. The compiler application 158 may execute in a first compute instance 155*a*. The compiler application 158 may spawn one hundred additional compute instances 155 and assign each of the additional computing instances 155 to convert a corresponding one of the source code files, thereby generating one hundred build artifacts. As such, there may be a one-to-one correspondence between compute instances 155 and a source code file in some embodiments. In other embodiments, a lesser number of compute instances 155 may be created or utilized, for instance, to save costs or computing resources.

Alternatively, to compile source code written by the developer into an executable computing application 199, in some embodiments, a customer may install a compiler application 158 locally on a client device 106 as opposed to a first compute instance 155*a*. The compiler application 158 on the client device 106 may create or utilize compute instances 155 to perform compilation of source code into a build artifact. For example, assume that the compiler application 158 is compiling an application having one hundred source code files. The compiler application 158 may execute in on the client device 106; however, the compiler application 158 may spawn one hundred compute instances 155 and assign each of the additional computing instances 155 to convert a corresponding one of the source code files, thereby generating one hundred build artifacts. As such, there may be a one-to-one correspondence between compute instances 155 and a source code file in some embodiments. In other embodiments, a lesser number of compute instances 155 may be created or utilized, for instance, to save costs or computing resources.

In further embodiments, a customer may install a compiler application 158 in a first compute instance 155a. Instead of the compiler application 158 creating or utilizing additional compute instances 155 to perform compilation of source code, the compiler application 158 may utilize the on-demand code execution service 140. Assume, for example, the compiler application 158 is compiling an application having fifty source code files. The compiler application 158 may execute in a compute instance 155. The compiler application 158 may spawn fifty serverless functions 153, where each of the serverless functions 153 converts a respective one of the source code files into fifty build artifacts. As such, there may be a one-to-one correspondence between serverless functions 153 and a source code file in some embodiments. In other embodiments, a lesser number of serverless functions 153 may be created or utilized, which may save costs or may utilize less computing resources.

As such, the compiler application 158 described herein may support compilation using multiple compute instances 155 or multiple serverless function 153, among other types of provider networks services 135. For Instance, a customer may install and use the compiler application 158 within a compute instance 155. On the other hand, for the on-demand code execution service 140, the customer may install the compiler application 158 to a compute instance 155, but the bulk of the compilation occurs via the on-demand code execution service 140. As may be appreciated, in some embodiments, the compute instance 155 may handle the creation and execution of compute instances 155 or serverless functions 153 directly or, in other words, without requiring an additional service to handle the operations on behalf of the compiler application 158.

In some embodiments, each source file may be pre-processed within the compute instance 155 of the compiler application 158 to gather dependencies, such as header files. Thereafter, pre-processed source code 195a . . . 195n (collectively "pre-processed source code 195") is submitted to the on-demand code execution service 140, along with one or more command line options specified by a developer. The code is optimized by the on-demand code execution service 140, for instance, in the serverless functions 153. The serverless function 153 then returns build artifacts to the compute instance of the compiler application 158. The compiler application 158 may then link the build artifacts to generate an executable computing application 199.

Based on the embodiments described herein, parallel builds are no longer limited by a number of cores in a compute instance 155. Instead, the compilation of each source code file executes as a separate serverless function 153. As such, developers and other customers can enjoy massive build parallelism initiated from a cheaper lightweight compute instance 155.

In various embodiments, the compiler application 158 may collect compiler usage data 164 regarding submitted source code and command-line options in an anonymous fashion, for instance, if a developer opts-in regarding data collection for improvement of the compiler application 158. The compiler usage data 164 may be aggregated from different customers that build a same or similar computing application. As such, customers may use a special compiler option to query most frequently used compiler options for a given source file, which may reveal previously unknown optimization opportunities. Accordingly, the compiler application may be extremely reliable compiler usage data 164 that allows developers to focus application testing on frequently used option combinations.

In some embodiments, the serverless functions 153 may receive pre-processed source code 195 directly from the compute instance 155 on which the compiler application 158 is installed, for example, when the pre-processed source code 195 has a file size less than a predetermined threshold. However, in scenarios in which the pre-processed source code 195 has a file size equal to or greater than a predetermined threshold (e.g., equal to or greater than a file size permitted by the on-demand code execution service 140), the serverless functions 153 may receive the pre-processed source code 195 from the data storage service 149. As such, the compiler application 158 may store the pre-processed source code 195 in the data storage service 149 in situations in which the file size of the pre-processed source code 195 meets or exceeds a file size threshold.

Figure 2A:
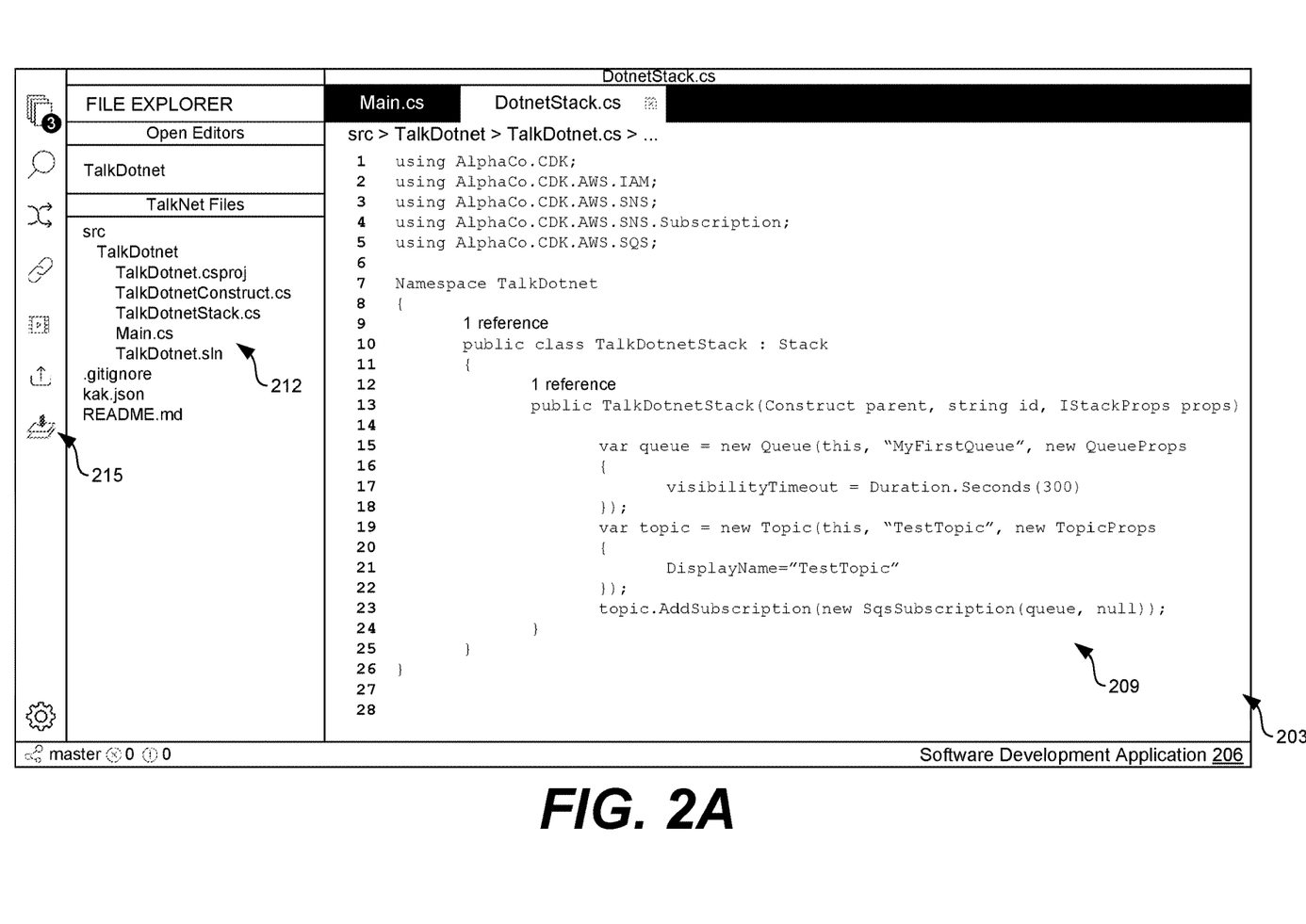
FIG. 2A is a pictorial diagram of an example user interface rendered by a client device in the networked environment of FIG. 1 according to various embodiments of the present disclosure.

Referring next to FIG. 2A, an example of a user interface 203 is shown according to various embodiments. Specifically, the user interface 203 includes one of a software development application 206, which may be a client application 175 executing in a client device 106. In the software development application 206, the developer may write or modify source code 209, which may be written in a programming language, such as C, C++, Java®, Fortran, Python, or other programming language. The code may be stored in one or more source code files 212, which may be invoked or incorporated into code located in other source code files 212. However, the source code 209 cannot be executed without first compiling the source code 209 into an executable computing application 199. To do so, the developer may select a compile icon 215 or other suitable user interface component.

Figure 2B:
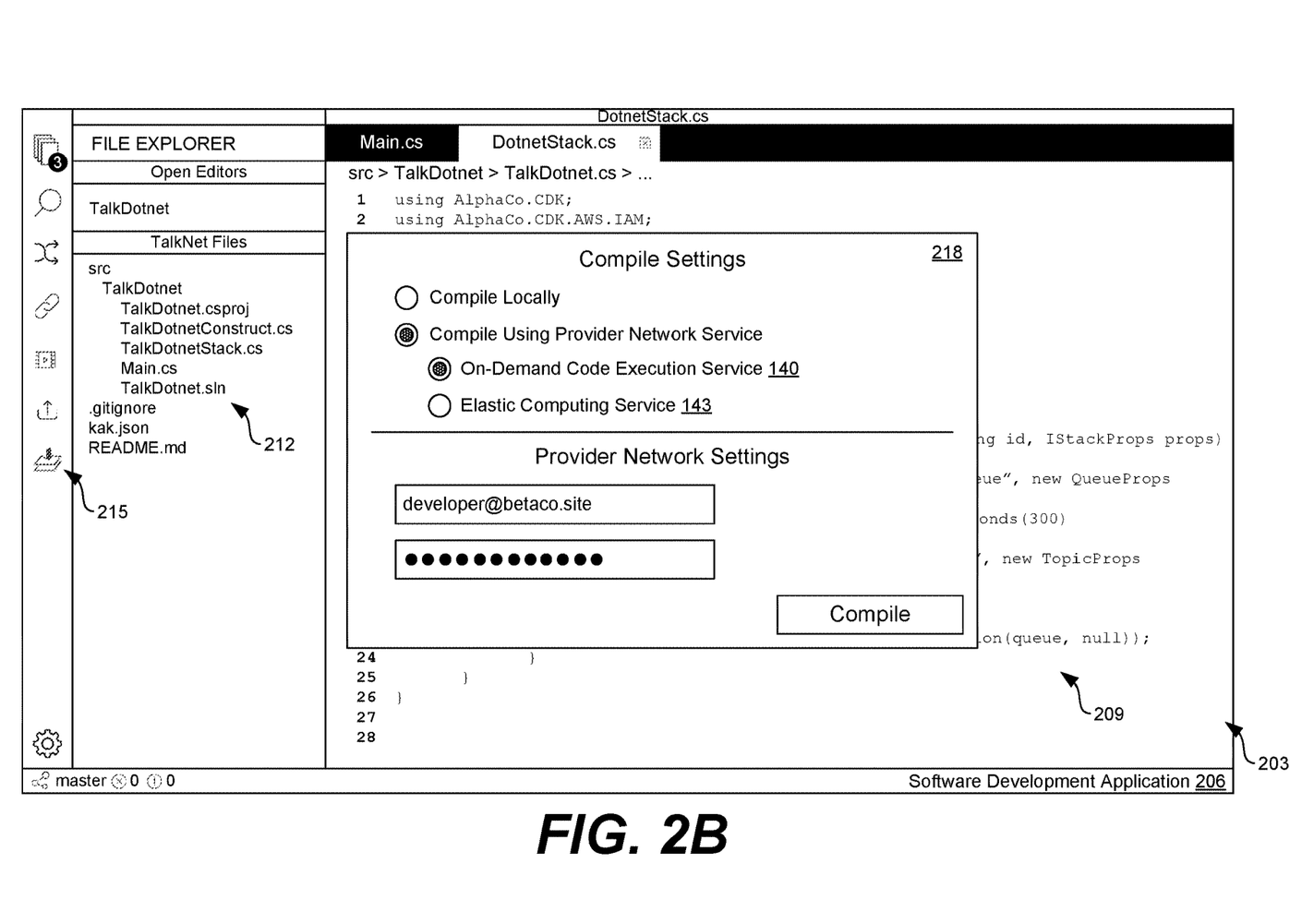
FIG. 2B is a pictorial diagram of an example user interface rendered by a client device in the networked environment of FIG. 1 according to various embodiments of the present disclosure.

Turning now to FIG. 2B, another example of a user interface 203 is shown according to various embodiments. Specifically, a dialog 218 is shown that may be presented in the user interface 203 after the compile icon 215 is selected or otherwise manipulated. The dialog 218 may present various settings that may be specified by a developer or other user to potentially optimize or increase the speed of compilation of the source code 209. The source code 209 may be stored on the client device 106 or in the computing environment 103, as may be appreciated.

For instance, a developer may select an option box that permits a computing application to be compiled locally on a client device 106. However, compilation of most computing applications on a client device 106 may take hours to days, and would prevent other operations from occurring on the client device 106. As such, in some embodiments, the developer may select an option box that directs the compilation of the source code 209 on a provider network service 135. More specifically, the developer may select a first option box that directs compilation to occur in the on-demand code execution service 140 or a second option box that directs compilation to occur in the elastic computing service 143. The dialog 218 may require the developer to provide authentication information, such as an email and password, to ensure that the developer has access to resources of the provider network services 135.

Based on the settings specified in the dialog 218 or other component of the user interface 203, one or more flags may be generated for the compiler application 158. For instance, assuming a command line instruction is generated to execute a compiler application 158, if the user specifies the on-demand code execution service 140, an -odces compile flag may be added to a command line to direct the compiler application 158 to utilize the on-demand code execution service 140. Alternatively, if the user specifies the elastic computing service 143, an -ecs compile flag may be added to a command line to direct the compiler application 158 to utilize the elastic computing service 143. The compiler application 158 is thus configured to send the instruction to a respective one of the computing environments 103 to compile the source code outside of the compute instance 155 of the compiler application 158 based on a specification of the developer-defined compile flag.

Figure 3:
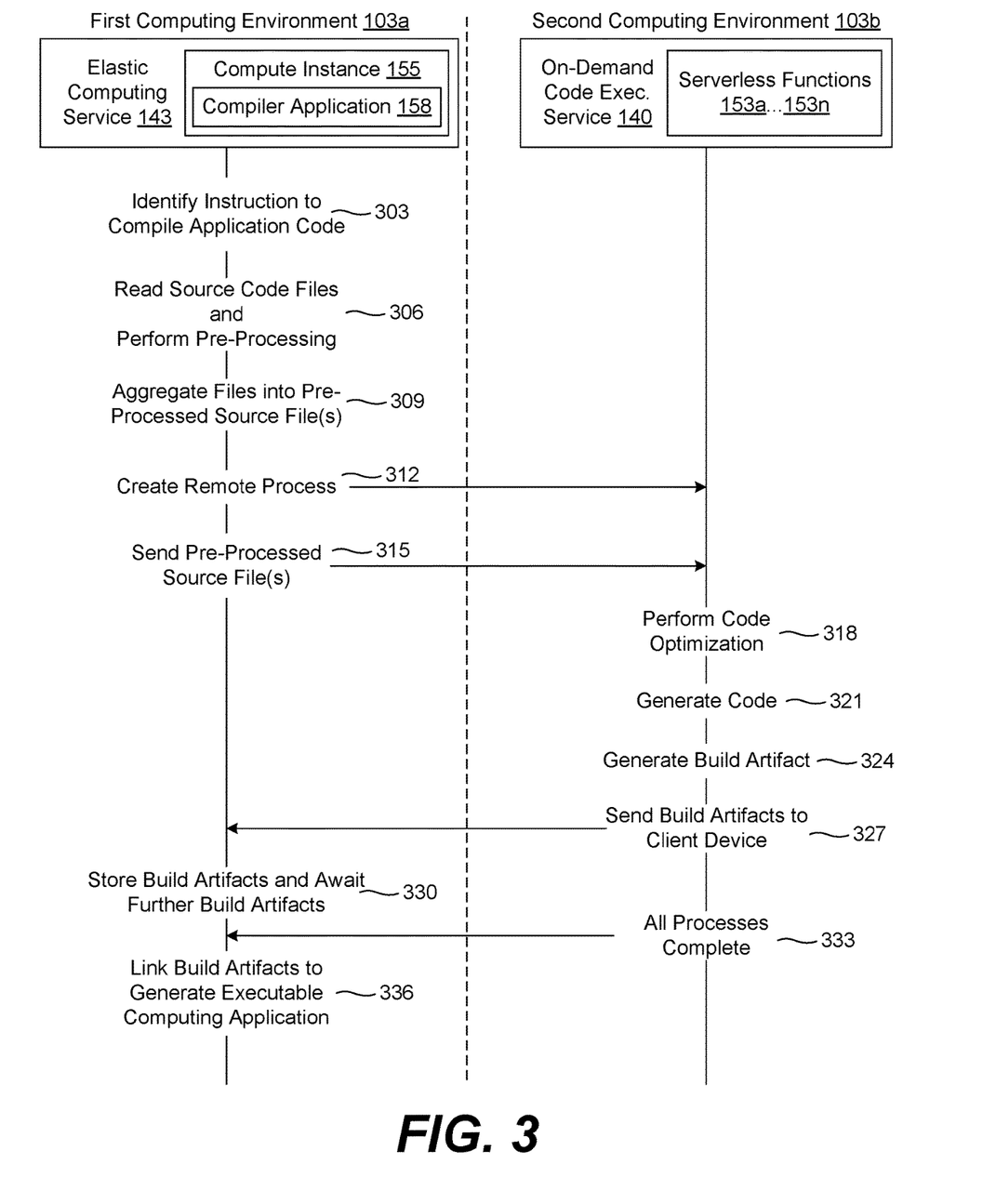
FIG. 3 is a sequence diagram illustrating one example of functionality of first and second computing environments in the networked environment of FIG. 1 according to various embodiments of the present disclosure.

Moving on to FIG. 3, a sequence diagram is shown illustrating an example embodiment of the networked environment 100 described herein. Specifically, FIG. 3 includes an interaction between a first computing environment 103a and a second computing environment 103b. For example, the first computing environment 103a includes a first set of one or more computing devices having the elastic computing service 143 executing thereon, whereas the second computing environment 103b includes a second set of one or more computing device having the on-demand code execution service 140 executing thereon.

Generally, the elastic computing service 143 may oversee a compute instance 155 having a compiler application 158 installed thereon. Accordingly, beginning with 303, the compiler application 158 may identify an instruction to compile application code or, in other words, an instruction to compile source code into an executable computing application 199.

Next, in 306, the compiler application 158 may read one or more source code files 212 written or otherwise provided by the developer, and may perform pre-processing of the source code files 212. In some embodiments, pre-processing comprises including dependencies (e.g., libraries, include files, or other dependencies) in the source code files 212, expanding macros in the source code files 212, and other traditional pre-processing as may be appreciated. In 309, the compiler application 158 may aggregate the source code files 212 into pre-processed source code 195.

In 312, the compiler application 158 may create one or more remote processes to compile the pre-processed source code 195 in parallel or, in other words, contemporaneously. For instance, as shown in FIG. 3, the compiler application 158 may send the pre-processed source code 195 to serverless functions 153 of the on-demand code execution service 140. The serverless functions 153 may be spawned with code that performs a compiler operation, such as converting code from a first language to a second language, as will be described.

Alternatively, at 315, the compiler application 158 may spawn additional compute instances 155 and send the pre-processed source code 195 to respective ones of the compute instances 155. The compute instances 155 may thus be spawned with code that performs a compiler operation, such as converting code from a first language to a second language.

However, referring to the embodiments where the parallel compilation of the pre-processed source code 195 is performed by the on-demand code execution service 140, as shown in FIG. 3, the serverless functions 153 may each receive a portion of the pre-processed source code 195, such as one of the pre-processed source code files. In 318, the serverless functions 153 may perform code optimization on the pre-processed source code 195.

Thereafter, in 321, the serverless functions 153 may generate code, such as assembly code, machine code, binary code, object code, or other low level code. Generating code may include transforming the pre-processed source code 195 from a higher-level language, such as a human-readable programming language, to a lower-level language, such as object code.

Next, in 321, the serverless functions 153 may generate build artifacts 324. In some embodiments, the build artifacts may include object files having object code contained therein. The object code may include machine code generated by the serverless function 153, as may be appreciated. In 327, the serverless functions 153 may send the build artifacts as generated to the compiler application 158. It is understood that 318-327 may be performed in parallel. For instance, multiple serverless functions 153 may perform code optimization, generate code, and generate build artifacts for different source code files 212 contemporaneously.

In 330, the compiler application 158 may store the build artifacts and may await further build artifacts. It is understood that serverless functions 153 processing larger ones of the source code file 212 may take longer to complete. As such, the compiler application 158 may receive the build artifacts asynchronously or at different times. In 333, when a last one of the serverless functions 153 completes generation of its build artifact, an "all processes complete" instructions may be sent to the compiler application 158.

Finally, in 336, the compiler application 158 may link the build artifacts as received to generate an executable computing application 199. The executable computing application 199 may be deployed in a compute instance 155 in a respective computing environment 103, or may be deployed using another type of provider network service 135.

Figure 4:
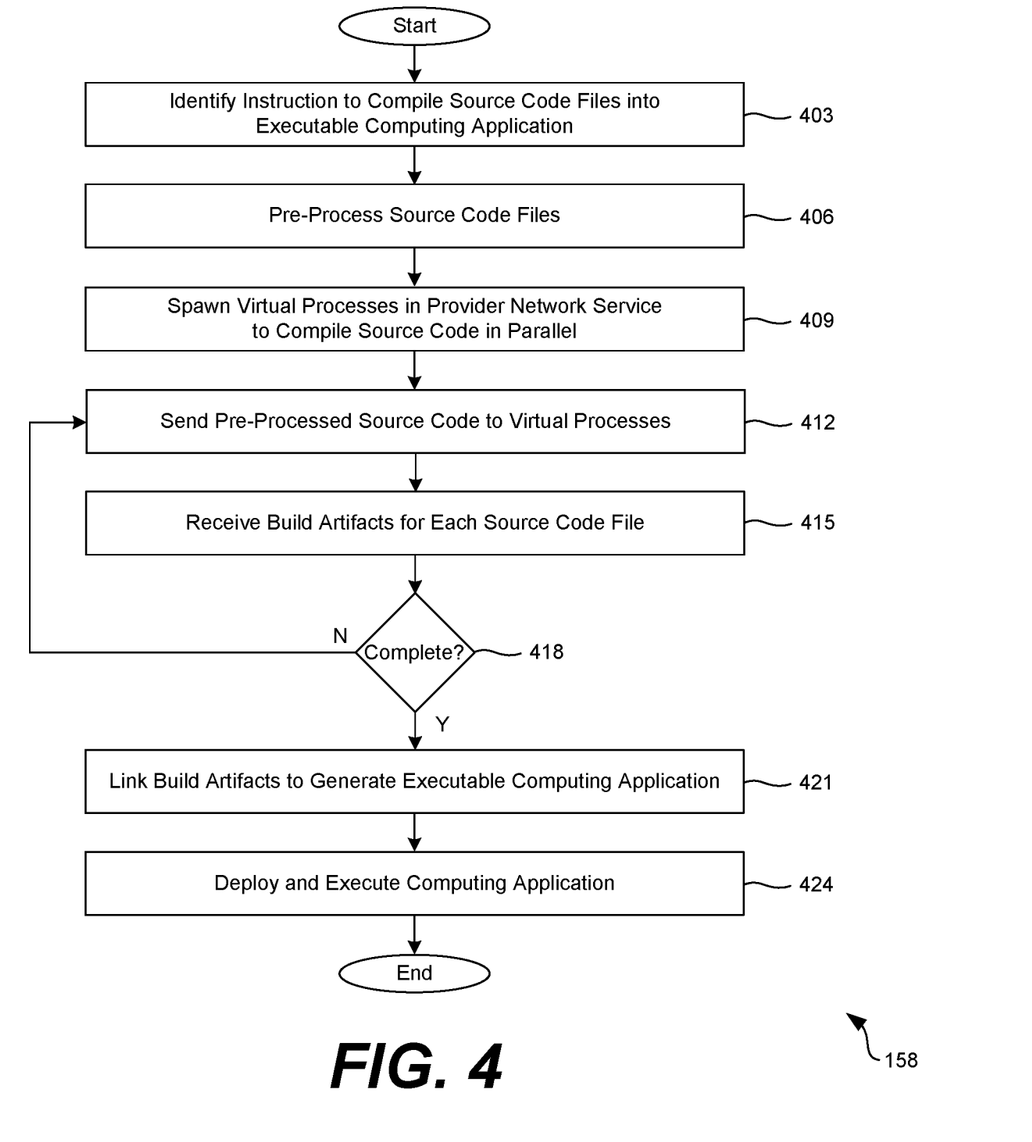
FIG. 4 is a flowchart illustrating one example of functionality implemented as portions of one or more provider network services executed in a computing environment in the networked environment of FIG. 1 according to various embodiments of the present disclosure.

Referring next to FIG. 4, shown is a flowchart that provides one example of the operation of a portion of the compiler application 158 according to various embodiments. It is understood that the flowchart of FIG. 4 provides merely an example of the many different types of functional arrangements that may be employed to implement the operation of the portion of the compiler application 158 as described herein. As an alternative, the flowchart of FIG. 4 may be viewed as depicting an example of elements of a method implemented in a first computing environment 103a according to one or more embodiments.

Beginning with box 403, the compiler application 158 may identify an instruction to compile source code files 212 into an executable computing application 199. For instance, a developer or other user may select or otherwise manipulate a compile icon 215 in a software development application 206. The instruction may include a command line instruction made in a shell or command prompt environment in some embodiments. As such, the command line argument may include one or more compile flags that direct the compiler application 158 to perform particular types of compilation at the instruction of the consumer.

For instance, if the developer specifies the on-demand code execution service 140 is to be used to compile an application, an -odces compile flag may be added to a command line. Alternatively, if the developer specifies the elastic computing service 143 is to be used to compile an application, an -ecs compile flag may be added to a command line to direct the compiler application 158 to utilize the elastic computing service 143. The compiler application 158 is thus configured to send the instruction to a respective one of the computing environments 103 to compile the source code outside of the compute instance 155 of the compiler application 158 based on a specification of the developer-defined compile flag. Alternatively, the compiler application 158 may generate the application locally, e.g., in the same compute instance 155 of the compiler application 158 or on the client device 106.

In box 406, the compiler application 158 may pre-process the source code files 212, thereby generating pre-processed source code 195. In some embodiments, pre-processing includes incorporating dependencies (e.g., libraries, include files, or other dependencies) in the source code files 212, expanding macros in the source code files 212, and other traditional pre-processing as may be appreciated.

In box 409, the compiler application 158 may spawn one or more virtual processes in a provider network service 135 to compile source code files in parallel. For instance, if the instruction received in box 403 specifies the on-demand code execution service 140 is to be used to compile the source code files 212, the compiler application 158 may create a multitude of serverless functions 153. In some embodiments, the compiler application 158 creates a number of serverless functions 153 equal to a number of source code files 212 to be compiled. Alternatively, if the instruction received in box 403 specifies the elastic computing service 143 is to be used to compile the source code files 212, the compiler application 158 may create a multitude of compute instances 155 separate from the compute instance 155 of the compiler application 158. In some embodiments, the compiler application 158 creates a number of compute instances 155 equal to a number of source code files 212 to be compiled.

In box 412, the compiler application 158 may send the pre-processed source code 195 to individual ones of the virtual processes spawned in box 409. For instance, assuming the virtual processes are serverless functions 153, the compiler application 158 may send first pre-processed source code 195a to a first serverless function 153a, second pre-processed source code 195b to a second serverless function 153b, and so forth. Alternatively, assuming the virtual processes are compute instances 155, the compiler application 158 execute in a first compute instance 155a, and may send first pre-processed source code 195a to a second compute instance 155b, second pre-processed source code 195b to a third compute instance 155b, and so forth.

In box 415, the compiler application 158 may receive a build artifact from each of the serverless functions 153 or the compute instances 155 as compilation is completed. As noted above, a build artifact may include an object file having object code to be executed by a processor.

In box 418, the compiler application 158 may determine whether the compilating of the computing application is complete. For instance, if the compiler application 158 spawned two hundred serverless functions 153 in box 406, the compiler application 158 may determine whether it has received two hundred build artifacts (or other suitable number of responses). If compilation of the computing application is not yet complete, the process may revert to box 412 to continue sending pre-processed source code until compilation is underway or complete. Alternatively, if compilation of the computing application is complete, the process may proceed to box 412.

Thus, in box 421, the compiler application 158 may link or otherwise organize the build artifacts as received to generate an executable computing application 199. The executable computing application 199 may be deployed in a compute instance 155 in a respective computing environment 103, or, in box 424, the executable computing application 199 may be deployed using another type of provider network service 135. Thereafter, the process may proceed to completion.

Figure 5:
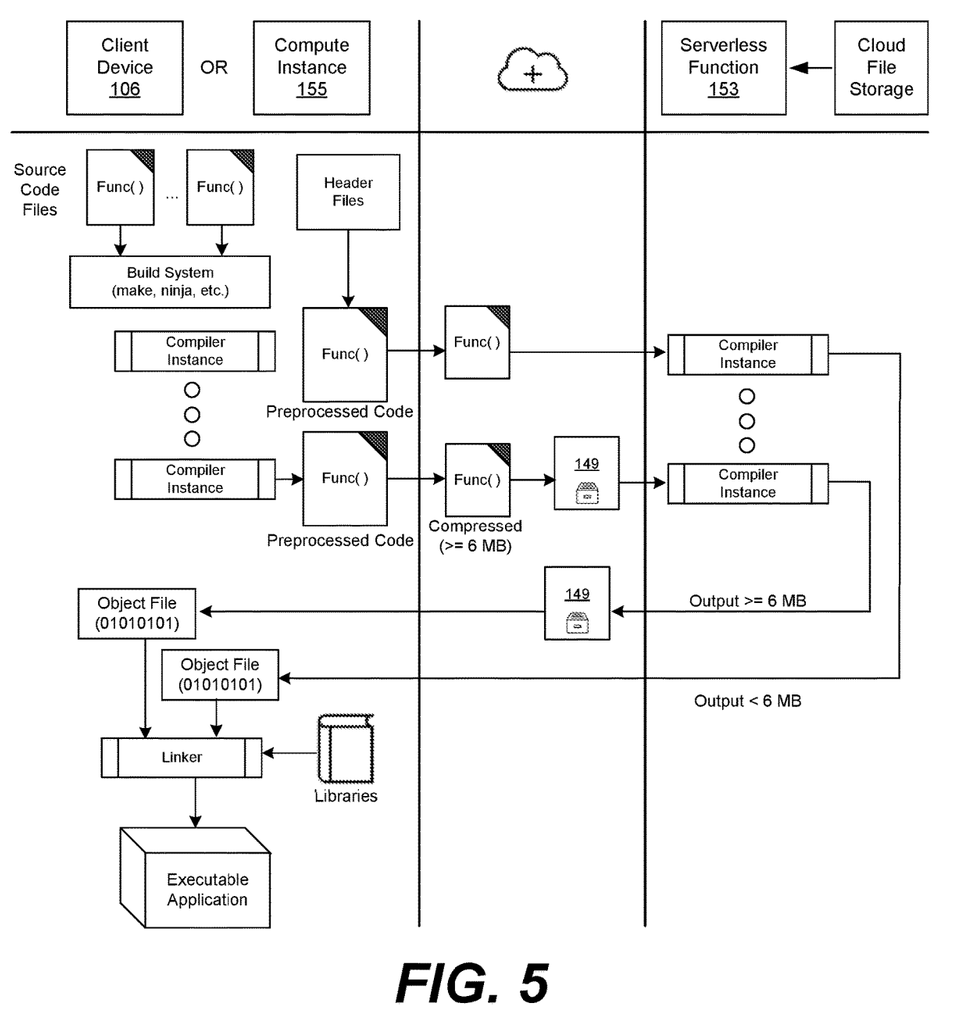
FIG. 5 is another sequence diagram illustrating one example of functionality of provider network services in the networked environment of FIG. 1 according to various embodiments of the present disclosure.

Turning now to FIG. 5, a sequence diagram is shown according to various embodiments. Notably, the sequence diagram illustrates use of a data storage service 149 as an intermediary between the client device 106 and the serverless functions 153 or, alternatively, an intermediary between the compute instance 155 and the serverless function 153. For instance, in some embodiments, the serverless functions 153 may receive pre-processed source code 195 directly from the client device 106 (if compiling locally on the client device 106) or the compute instance 155 (if compiling remotely on a provider network service 135) on which the compiler application 158 is installed, for example, when the pre-processed source code 195 has a file size less than a predetermined threshold, such as 6 MB.

However, in situations in which the pre-processed source code 195 has a file size equal to or greater than a predetermined threshold (e.g., equal to a greater than 6 MB), the serverless functions 153 may receive the pre-processed source code 195 from the data storage service 149. As such, the client device 106 or the compute instance 155 may store the pre-processed source code 195 in the data storage service 149 in situations in which the file size of the pre-processed source code 195 meets or exceeds a file size threshold.

Similarly, when a respective one of the build artifacts has a file size less than a predetermined threshold (e.g., less than 6 MB), the serverless function 153 may send the respective one of the build artifacts directly to the compute instance 155 or client device 106. When a respective one of the build artifacts has a file size equal to or greater than a predetermined threshold (e.g., equal to or greater than 6 MB), the serverless function 163 may send the respective one of the build artifacts to the data storage service 149 executing in a third computing environment 103c, for example, where the compute instance 155 or the client device 106 are configured to retrieve the respective one of the build artifacts from the data storage service 149.

Figure 6:
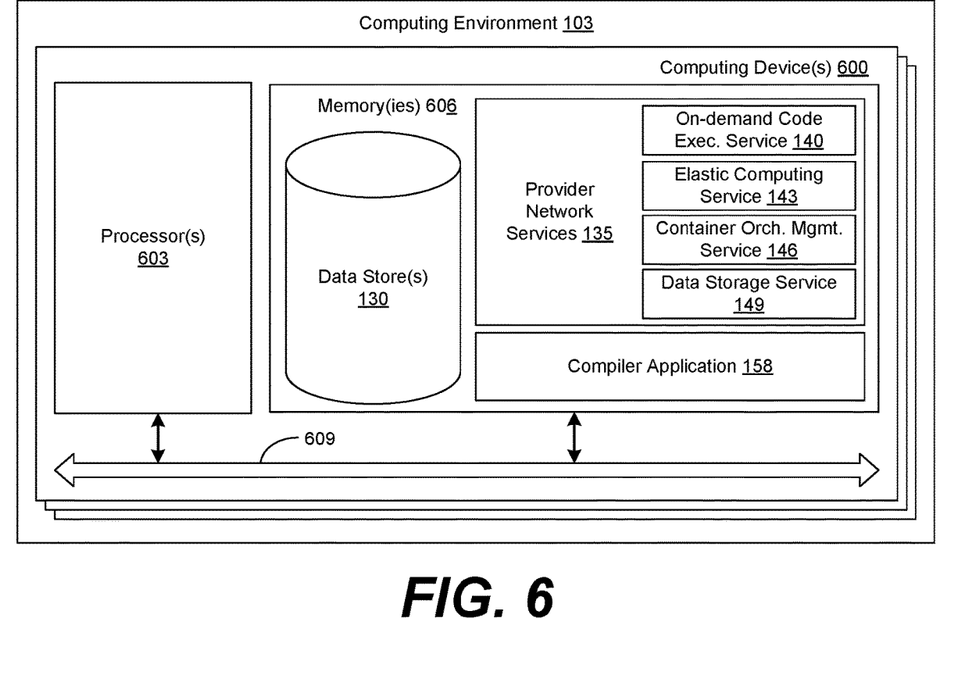
FIG. 6 is a schematic block diagram that provides one example illustration of a representative computing environment employed in the networked environment of FIG. 1 according to various embodiments of the present disclosure.

With reference to FIG. 6, shown is a schematic block diagram of a representative one of the computing environments 103 according to an embodiment of the present disclosure. Each computing environment 103 may include one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the provider network services 135 (e.g., the on-demand code execution service 140, the elastic computing service 143, the container orchestration and management service 146, and the data storage service 149), the compiler application 158, a compiled computing application, and potentially other applications. Also stored in the memory 606 may be a data store 130 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the provider network services 135 (e.g., the on-demand code execution service 140, the elastic computing service 143, the container orchestration and management service 146, and the data storage service 149), the compiler application 158, a compiled computing application, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagram and the flowchart of FIGS. 3 and 4, respectively show the functionality and operation of an implementation of portions of the compiler application 158. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the sequence diagram and the flowchart of FIGS. 3 and 4, respectively, show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the provider network services 135 (e.g., the on-demand code execution service 140, the elastic computing service 143, the container orchestration and management service 146, and the data storage service 149), the compiler application 158, and a compiled computing application, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the provider network services 135 (e.g., the on-demand code execution service 140, the elastic computing service 143, the container orchestration and management service 146, and the data storage service 149), the compiler application 158, and a compiled computing application, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices 600 in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
a plurality of computing devices comprising at least one hardware processor; and
program instructions stored in memory and executable by the at least one hardware processor that, when executed, direct the at least one computing device to:
direct installation of a compiler application in a compute instance of a cloud computing service;
receive an instruction to compile source code into an executable application, wherein the instruction comprises a flag to compile at least a portion of the source code separate from the compute instance;
pre-process the source code in the compute instance to generate a plurality of pre-processed source code files, individual ones of the preprocessed source code files comprising at least one dependency corresponding to at least one of a library, a header, an include file, or any combination thereof, wherein the at least one dependency specified and unincluded in respective ones of a plurality of source code files is retrieved and incorporated into the individual ones of the preprocessed source code files;
create a plurality of serverless functions executable by an on-demand code execution service remotely from the plurality of computing devices, wherein individual ones of the plurality of serverless functions of the plurality of serverless functions are assigned to compile a single respective pre-processed source code file of the plurality of pre-processed source code files in parallel with respect to other serverless functions of the plurality of serverless functions that are assigned to compile other pre-processed source code files of the plurality of pre-processed source code files;
receive a plurality of build artifacts from the plurality of serverless functions that correspond to individual ones of the plurality of pre-processed source code files; and
generate the executable application by linking the build artifacts received from the plurality of serverless functions.

2. The system of claim 1, wherein the executable application is an application configured for execution in another compute instance of the cloud computing service.

3. The system of claim 1, wherein the build artifacts comprise a plurality of object files generated by a respective one of the plurality of serverless functions.

4. A computer-implemented method, comprising:
receiving, by a first computing environment, an instruction to compile source code into an executable computing application;
creating, by the first computing environment, a plurality of serverless functions configured to execute in parallel;
preprocessing, by the first computing environment, the source code to generate a plurality of pre-processed source code files, individual ones of the preprocessed source code files comprising at least one dependency corresponding to at least one of a library, a header, an include file, or any combination thereof, wherein the at least one dependency specified and unincorporated in respective ones of a plurality of source code files is retrieved and incorporated into the individual ones of the preprocessed source code files;
generating, by the first computing environment, instructions that cause the serverless functions to perform a compiler operation that compiles the plurality of source code files into a respective plurality of build artifacts, individual ones of the serverless functions compiling a respective one of the plurality of source code files in parallel with respect to other ones of the serverless functions compiling other respective ones of the plurality of source code files; and
receiving, by the first computing environment, the plurality of build artifacts from the serverless functions, wherein the plurality of build artifacts are linked to generate the executable computing application.

5. The computer-implemented method of claim 4, wherein:
the first computing environment comprises a first plurality of computing devices having an on-demand code execution service executing thereon; and individual ones of the plurality of serverless functions are executable by the on-demand code execution service.

6. The computer-implemented method of claim 5, wherein:
the first computing environment comprises an elastic computing service executing thereon;
a compute instance of the elastic computing service has a compiler application installed therein; and
the instructions that cause the serverless functions to perform the compiler operation are sent from the compiler application.

7. The computer-implemented method of claim 6, wherein:
the compute instance having the compiler application installed therein is a first compute instance; and
the executable computing application is an application configured for execution in a second compute instance of the elastic computing service.

8. The computer-implemented method of claim 7, wherein the compiler application is configured to send the instruction to the first computing environment to compile the source code outside of the first compute instance in response to a specification of a developer-defined compile flag.

9. The computer-implemented method of claim 4, wherein individual ones of the plurality of serverless functions are configured to perform code optimization on at least one of the plurality of source code files prior to generating a respective one of the plurality of build artifacts.

10. The computer-implemented method of claim 4, further comprising:
in response to a particular one of the plurality of source code files having a file size less than a predetermined threshold, transmitting, by the first computing environment, the particular one of the plurality of source code files directly to a second computing environment comprising the serverless functions.

11. The computer-implemented method of claim 4, further comprising:
in response to a particular one of the plurality of source code files having a file size equal to or greater than a predetermined threshold, providing, by the first computing environment, the particular one of the plurality of source code files using a network-based data storage service executing in a third computing environment, the third computing environment comprising a plurality of computing devices.

12. The computer-implemented method of claim 4, further comprising:
in response to a particular one of the plurality of build artifacts having a file size less than a predetermined threshold, sending, by the first computing environment, the particular one of the plurality of build artifacts directly to a second computing environment comprising the serverless functions.

13. The computer-implemented method of claim 4, further comprising:
in response to a particular one of the plurality of build artifacts having a file size equal to or greater than a predetermined threshold, sending, by the first computing environment, the particular one of the plurality of build artifacts to a network-based data storage service executing in a third computing environment over a network, the third computing environment comprising a plurality of computing devices, the serverless functions being configured to retrieve the particular one of the plurality of build artifacts from the network-based data storage service.

14. The computer-implemented method of claim 4, wherein the plurality of build artifacts comprise a plurality of object files and the source code files are pre-processed source code files.

15. The computer-implemented method of claim 6, further comprising:
aggregating usage data in association with the compiling of the plurality of source code files into one of the plurality of build artifacts and other compilations by the compiler application; and
presenting the usage data as aggregated to a subsequent user of the compiler application, wherein the usage data comprises a most frequently used compiler option for a respective one of the plurality of source code files.

16. A non-transitory computer-readable medium embodying program instructions executable by at least one computing device having at least one hardware processor that, when executed, direct the at least one computing device to:
execute a compiler application in a compute instance of a provider network service;
in response to an instruction to compile source code of an application, pre-process the source code to generate pre-processed source code, the pre-processed source code comprising at least one dependency corresponding to at least one of a library, a header, an include file, or any combination thereof that is specified and unincluded in the source code, wherein the at least one dependency is retrieved and incorporated into the pre-processed source code;
in response to the instruction to compile source code of the application, direct the provider network service to generate a plurality of serverless functions executable by an on-demand code execution service to compile a plurality of portions of the source code of the application separate from the compute instance having the compiler application executing thereon, individual ones of the plurality of serverless functions compiling a single respective one of the plurality of portions of the source code in parallel with respect to other ones of the plurality of serverless functions compiling other ones of the plurality of portions of the source code;
in response to the virtual processes completing compilation of the portion of the source code, receive a plurality of build artifacts from individual ones of the plurality of serverless functions; and
link the build artifacts to generate an executable computing application.

17. The non-transitory computer-readable medium of claim 16, wherein the compiler application receives an instruction indicating that all processes are complete based at least in part on the plurality of serverless functions completing generation of the plurality of build artifacts.

18. The non-transitory computer-readable medium of claim 16, wherein:
the compute instance is one of a plurality of compute instances maintained by an elastic computing service.

19. The non-transitory computer-readable medium of claim 18, wherein:
the compute instance having the compiler application installed therein is a first compute instance; and
the executable computing application is an application configured for execution in a second compute instance of the elastic computing service.

20. The non-transitory computer-readable medium of claim 16, wherein:

the plurality of serverless functions are each configured to optimize one of a plurality of source code files of the source code prior to generating respective ones of the plurality of build artifacts.

\* \* \* \* \*